UNITED STATES PATENT OFFICE.

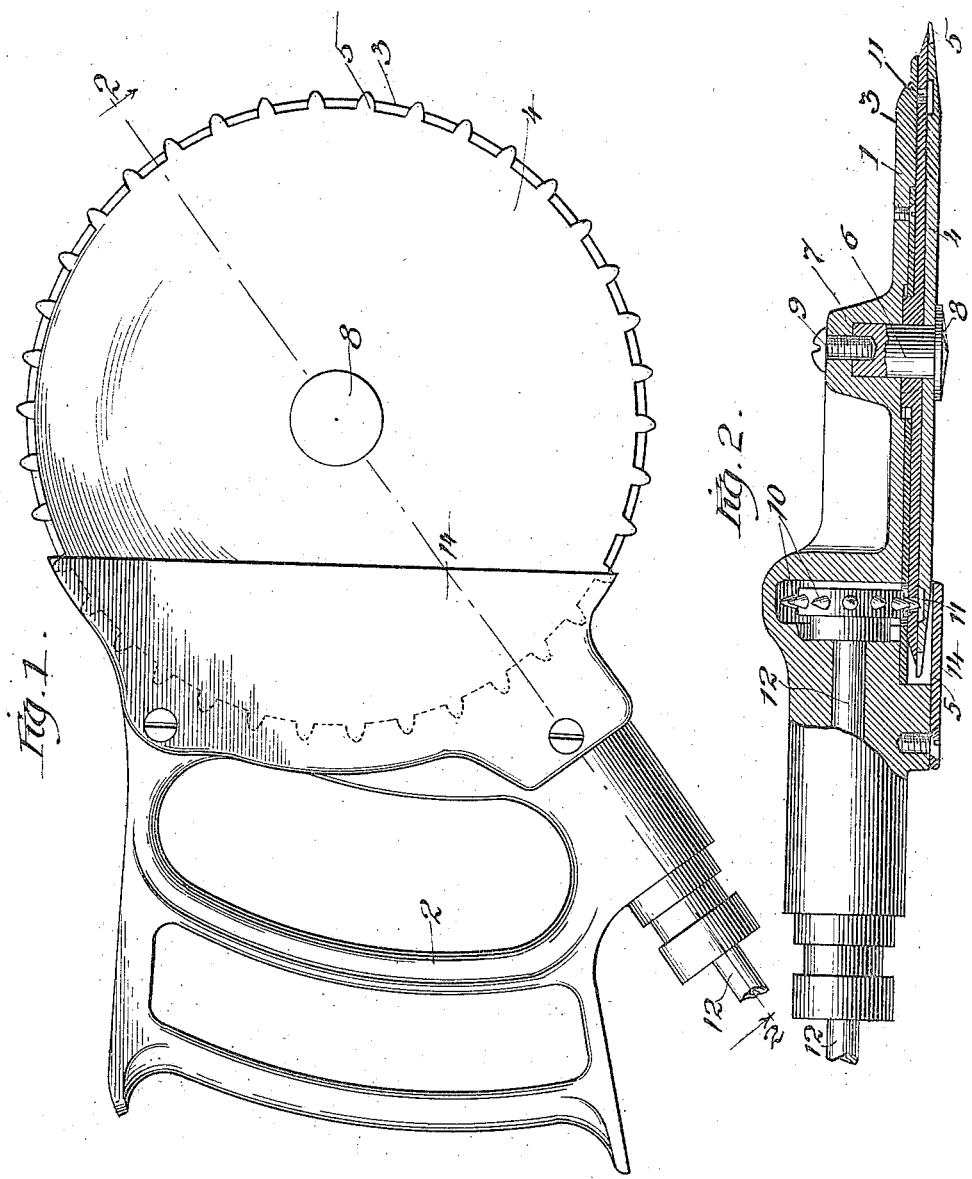

FRANK JACKSON, OF CHICAGO, ILLINOIS.

SKINNING-TOOL.

1,239,489.          Specification of Letters Patent.      Patented Sept. 11, 1917.

Application filed November 16, 1916. Serial No. 131,627.

*To all whom it may concern:*

Be it known that I, FRANK JACKSON, a citizen of the United States, residing at Chicago, county of Cook, State of Illinois, have invented a certain new and useful Improvement in Skinning-Tools, and declare the following to be a full, clear, and exact description of the same, such as will enable others skilled in the art to which it pertains to make and use the same, reference being had to the accompanying drawings, which form a part of this specification.

In my prior Patents Nos. 964,865 and 1,168,726, granted respectively on July 19, 1910, and January 18, 1916, I have disclosed a type of tool, involving a rotary knife, for quickly and efficiently removing hides from slaughtered animals, particularly cattle, without danger of cutting, scoring or otherwise injuring the hide and without breaking through the surface of the meat and detracting from the appearance thereof. While the tools illustrated in the aforesaid patents will do their work much better than is possible with an ordinary skinning knife, I have found that by somewhat changing the construction, even better results may be obtained.

Therefore, viewed in one of its aspects, my invention may be regarded as having for its object to improve the construction of the tools disclosed in my prior patents, whereby the work to be done thereby can be performed more expeditiously and efficiently.

In the tools of my prior patents the revolving knives have been protected by guards whose teeth project beyond the cutting edges of the knives, the teeth being stationary with respect to the frame or handle. I have found that the guard teeth, which must be pressed into the tissue or fell in advance of the cutting edges of the knives, often meet with considerable resistance and make the work heavier than it would be with an unprotected knife. The principal object of my invention is so to arrange the guard for the revolving cutter that all of the advantages of the tools of my prior patents will be retained, with substantially a complete elimination of the resistance to movement of the tool as a whole; thus insuring a quick removal of the hide without injury to the hide or to the flesh with a minimum expenditure of labor and thus greatly expediting the skinning process.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side view of a tool arranged in accordance with a preferred form of my invention; and Fig. 2 is a view partly in elevation and partly in section on line 2—2 of Fig. 1.

Referring to the drawing, 1 represents a disk-like plate carried on the front end of a handle, 2, of any suitable size or shape. Lying against one face of the member 1 is a knife, 3, preferably circular in form, large enough in diameter to bring its cutting edge beyond the edge of the plate on the end of the tool opposite that at which the handle is located. Lying against the outer face of the knife is a guard, 4, in the form of a disk somewhat smaller in diameter than the knife and having teeth, 5, projecting from the periphery outwardly beyond the cutting edge of the knife. The knife and the guard are both mounted so as to be capable of revolving about a common axis, preferably extending at right angles to the plate 1 at the center of the latter. In the arrangement shown, the knife and the guard are revolubly supported on a pin, 6, extending through the knife and the guard into a boss, 7, on the rear side of the supporting plate. The pin is provided with a head, 8, on its outer end while a screw, 9, passing into the pin from the rear side of the boss 7, holds the parts in their assembled positions. The inner end of the pin preferably bears against the bottom of the socket in which it rests, the parts being so proportioned that the knife and the guard will be left rotatable on the pin, no matter how tight the adjustment of the screw 9 is made.

The knife is driven in any suitable way, preferably as in my prior patents by a pinion, 10, whose teeth mesh with openings, 11, arranged in a circle in the knife at a considerable distance from the axis of rotation; the pinion being carried on the inner end of a shaft, 12, which extends to the exterior of the tool and may be driven from any suitable source of power. If desired, an auxiliary guard, 14, may be placed over that portion of the guard 4 in the vicinity of the handle; the guard 14 forming with the handle and the adjacent portions of the supporting plate a housing or pocket which will prevent the fingers or clothing of the user from getting caught in the tool in what may be called the rear end thereof.

It will be seen that when the tool is inserted into the tissue or fell underneath the hide and is moved along, the toothed guard is permitted to take a rolling motion so that the movement of the tool is not retarded as it is by stationary guard teeth which catch in the tissue or fell and resist the movement of the tool. In other words, while the guard perfectly performs its function of protecting the hide and the meat, it leaves the tool as free to be moved along through the tissue or fell as though there were no guard; and therefore the operation of the tool is easy and smooth and a hide can be removed in a much shorter time and with a much less expenditure of energy on the part of the workman than with a tool having stationary guard teeth.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a tool of the character described, a handled plate, a circular knife lying against one side of the plate, a circular toothed guard lying outside of and co-axial with the knife, a single fastening device for the knife and the guard comprising a pin projecting through the same into said plate and having on its outer end a head engaging with the outer side of the guard, said plate having a socket for receiving the inner end of the pin, and the parts being so proportioned and arranged that when the pin is seated in said socket it holds the knife and the guard in place and permits them to rotate freely independently of each other, and means for driving said knife.

2. In a tool of the character described, a handled plate, a circular knife lying against one side of the plate, a circular toothed guard lying outside of and concentric with the knife, a headed journal pin extending through the guard and the knife into said plate to hold the knife and guard in position and permit them to rotate independently of each other, means for driving said knife, and an auxiliary guard extending from said handle over those portions of the guard and knife lying in the vicinity of the handle.

In testimony whereof, I sign this specification.

FRANK JACKSON.

Copies of this patent may be obtained for five cents each, by addressing the "Commissioner of Patents, Washington, D. C."